United States Patent
Brandinger et al.

(10) Patent No.: US 6,605,799 B2
(45) Date of Patent: Aug. 12, 2003

(54) MODULATION OF LASER ENERGY WITH A PREDEFINED PATTERN

(75) Inventors: Jay J. Brandinger, Pennington, NJ (US); Brian D. Hoffman, Princeton, NJ (US); Edward T. Polkowski, Lloyd Harbor, NY (US)

(73) Assignee: Westar Photonics, Pennington, NJ (US)

( * ) Notice: Subject to any disclaimer, the term of this patent is extended or adjusted under 35 U.S.C. 154(b) by 0 days.

(21) Appl. No.: 09/865,936

(22) Filed: May 25, 2001

(65) Prior Publication Data

US 2001/0045418 A1 Nov. 29, 2001

Related U.S. Application Data

(60) Provisional application No. 60/207,066, filed on May 25, 2000.

(51) Int. Cl.[7] .............................................. B23K 26/36
(52) U.S. Cl. .............................. 219/121.74; 219/121.77
(58) Field of Search ......................... 219/121.6, 121.61, 219/121.67, 121.68, 121.69, 121.72, 121.73, 121.74, 121.76, 121.77

(56) References Cited

U.S. PATENT DOCUMENTS

| | | |
|---|---|---|
| 4,744,615 A | 5/1988 | Fan et al. |
| 5,113,055 A | 5/1992 | Kuriyama |
| 5,168,454 A | 12/1992 | La Plante et al. |
| 5,268,554 A | 12/1993 | Ream |
| 5,676,866 A | 10/1997 | in den Baumen et al. |
| 5,848,091 A | 12/1998 | Mombo Caristan |
| 5,864,430 A | 1/1999 | Dickey et al. |
| 5,925,271 A | 7/1999 | Pollack et al. |
| 6,037,564 A | 3/2000 | Tatah |
| 6,115,185 A * | 9/2000 | Du et al. ..................... 359/628 |

FOREIGN PATENT DOCUMENTS

JP 408174242 A * 7/1996 ............ 219/121.68

* cited by examiner

Primary Examiner—Samuel M. Heinrich
(74) Attorney, Agent, or Firm—Woodbridge & Associates, PC; Richard C. Woodbridge, Esq.

(57) ABSTRACT

A laser machining device is capable of simultaneously machining two- or three dimentional patterns on the surface of a workpiece. A micromirror array positioned within a laser cavity generates a patterned plurality of laser beamlets which can be homogenized and deflected by a second micromirror array onto the surface of a workpiece to create a two-dimensional pattern. Alternatively, the second micromirror array can deflect laser beamlets of unequal energy density to produce a three-dimensional pattern.

17 Claims, 8 Drawing Sheets

MODULATION OF LASER ENERGY WITH A PREDEFINED PATTERN

CROSS REFERENCE TO RELATED APPLICATIONS

This application claims the priority of provisional U.S. Application Serial No. 60/207,066 filed on May 25, 2000 and entitled "Modulation of Laser Energy with a Predefined Patter" by Jay J. Brandinger, Brian D. Hoffman and Edward To Polkowski the entire contents and substance of which are hereby incorporated in total by reference.

BACKGROUND OF THE INVENTION

1. Field of the Invention

This invention relates to an apparatus and method for simultaneous laser machining of defined patterns on the surface of a workpiece.

2. Description of Related Art

Lasers are used for a variety of materials machining purposes including drilling, contouring surfaces, cutting, scribing, trimming and pattern depositions. Typically, carbon dioxide lasers are used for scribing, drilling and machining. Excimer lasers are used for film ablation, flex circuits and relief cutting. YAG lasers are used for trimming resistors, capacitors, marking and cutting of metals, semiconductors and absorptive synthetics. An apparatus and method for sequentially drilling small holes in a workpiece using a laser are described by LaPlante et. al in U.S. Pat. No. 5,168,454. Orienting and focusing a single laser beam to scan a workpiece using such a method is slow and inefficient compared to parallel processing using multiple laser beams.

In the past, the creation of a plurality of beamlets for laser machining has been dependent on external beam shaping optics and deflecting devices to machine different points on a workpiece simultaneously. Typically, optical interface, scattering and transmission losses reduce system efficiency, requiring increased energy from the laser. Further, the use of a separate deflecting device not only increases system complexity but also increases the optical path length and required alignment precision.

In U.S. Pat. No. 5,676,866, Baumen et al. describes a microlens optical element which divides a laser beam into a plurality of beamlets which in turn are deflected by separate independent mirrors. This arrangement permits the simultaneous machining of a workpiece, e.g., the drilling of multiple holes. The position of the individual beams can be rapidly displaced in their coordinate location or with sufficient mirror deflection, removed from the optical path. The complexity and optical inefficiency of this system adds significant structure and cost.

In U.S. Pat. No. 6,037,564, Tatah describes a diffractive element which diffracts a single laser beam into a plurality of beamlets that are in turn deflected by individual micromirrors so as to simultaneously machine a workpiece. The micromirrors are two state devices either directing the beamlets to the workpiece or away from it. Galvo mirrors are used to displace the beamlets in their coordinate position. The complexity and optical inefficiency of this system adds significantly more structure and cost when compare to the Baumen et. al. technique described above.

Other laser machining devices such as described in U.S. Pat. Nos. 5,268,554 and 5,113,055 have the disadvantages of sequential scanning and changing beam size with deflection.

In U.S. Pat. No. 5,864,430, Dickey et al. discloses a laser with a Gaussian beam profile which is modified to produce a beam with a uniform profile using the Fourier transform properties of lenses. Complex optical elements, including a telescope to control the beam radius, transform lenses to set the target spot and focal length. Phase elements are required to determine the quality of the system. The system is complex and requires precision alignment, which adds to its cost. Further, physical elements must be changed to change beam characteristics.

Other beam shaping systems such as described in U.S. Pat. Nos. 5,925,271, 5,848,091 and 4,744,615 use fixed optical elements external to the laser to shape the beam profile. Optical interface, scattering and transmission losses reduce system efficiency requiring increased energy from the laser resulting in cost and complexity disadvantages.

It is clear from the foregoing analysis that a serious need exists for a laser machining apparatus which avoids the problem of non-uniform laser beam profiles which results from multimode oscillations in the laser cavity, and which allows for the creation of multiple beamlets from a single laser beam for rapid material machining. Prior art solutions use external optical elements and mirrors to solve both of these problems resulting in complex structures, optical inefficiency, precision alignment and significant added cost.

SUMMARY OF THE INVENTION

Briefly described, the invention comprises a laser apparatus for simultaneous machining at several points on the surface of a workpiece. The apparatus includes a laser laser cavity containing a first micromirror array having a first plurality of individual micromirrors for generating a patterned beam of discrete laser beamlets from a single laser beam. The apparatus also includes a second micromirror array having a second plurality of individual micromirrors for modifying the patterned plurality of laser beamlets and deflecting them onto several points on the surface of a workpiece. Also included in the apparatus are means for controlling each of the micromirrors of both micromirror arrays so that each is changeable in position independently of each other. When the individual micromirrors of the second array are positioned to reflect laser beamlets of equal energy distribution, a two-dimentional pattern is produced on the surface of the workpiece. Alternatively, when the individual micromirrors of the second array are positioned to reflect laser beamlets of unequal energy distribution, a three-dimentional pattern is produced on the surface of the workpiece.

The invention may be more fully understood by reference to the following drawings.

DETAILED DESCRIPTION OF THE PREFERRED EMBODIMENT

During the course of this description like numbers will be used to identify like elements according to the different views that illustrate the invention.

Figure 1:
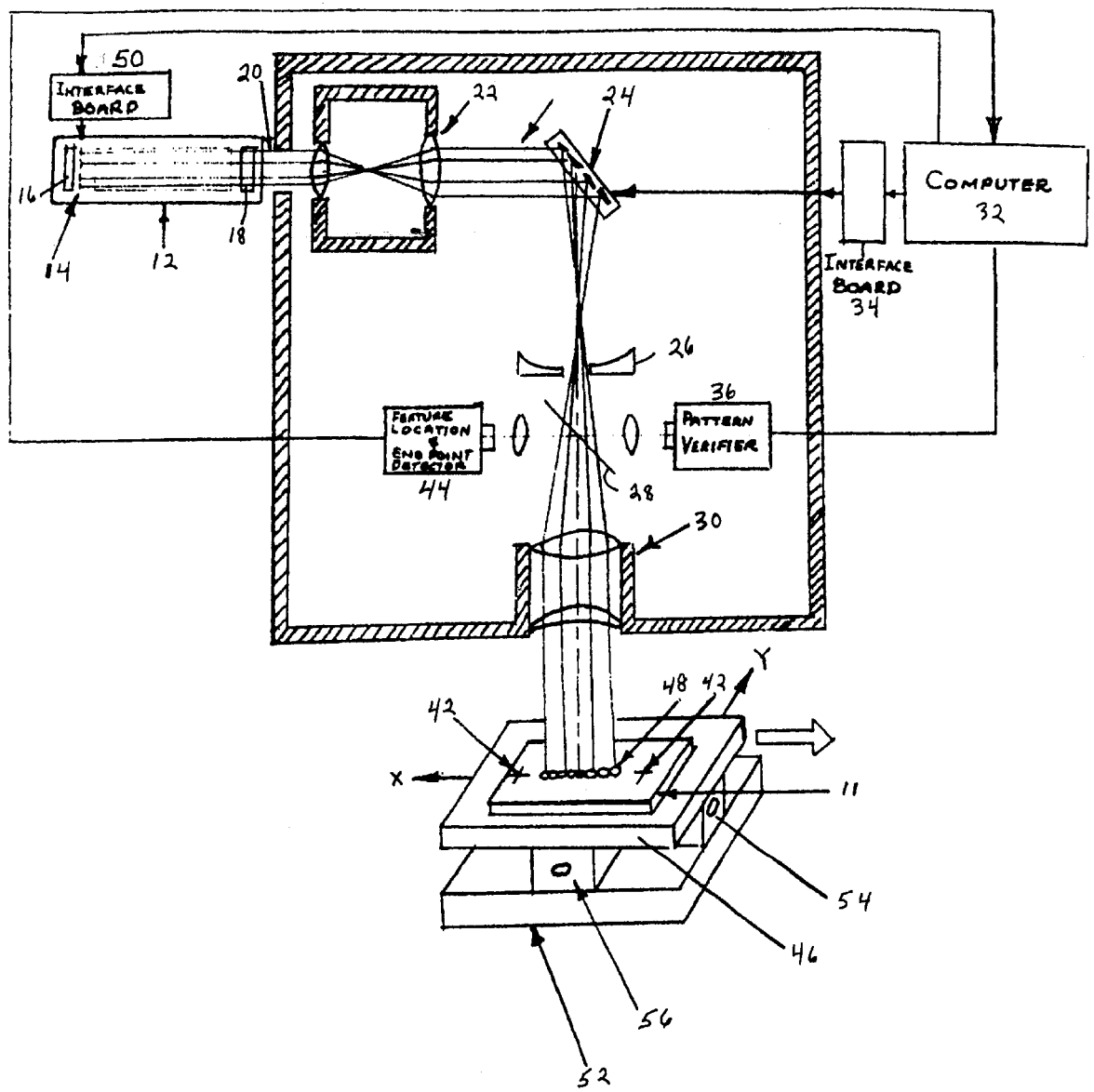
FIG. 1 is a schematic diagram of a preferred apparatus for the simultaneous laser machining of defined patterns according to the present invention.

A preferred embodiment of the apparatus of this invention for simultaneous machining of defined patterns is shown in FIG. 1. Laser 12 has a laser cavity 14, which contains a first micromirror array 16 for generating a plurality of laser beamlets 20a,b,c . . . , and a partial reflector 18. Each of the individual beamlets 20a,b,c, . . . emerging from laser 12 via partial reflector 18 is imaged by first imaging means 22 onto an addressable second micromirror array 24, which modulates the beamlets 20a,b,c . . . , and in turn deflects them through a second imaging means 30 onto a workpiece 40. Spatial beam limiting is provided by optical element 26. The positions of the individual beamlets 20a,b,c, . . . impinging on the workpiece 40 are adjusted by deflection of the mirrors of the second micromirror array 24, based on input from computer 32, through first interface board 34.

In FIG. 1, the beamlets 20a,b,c . . . are imaged by a beam splitter 28, which deflects a small portion of the beamlets on to a pattern verifier 36, so as to determine the position and integrity of the beamlets. The pattern verifier 36, in turn, provides the computer 32 with the electrical image for comparison with the chosen material machining pattern input 38. The location of index marks 42, on the workpiece 40, are determined by the feature location and endpoint detection device 44.

As shown, illumination of the workpiece index marks 42 is provided by the beamlets but it is also understood that a separate workpiece illuminator may also be used to locate index marks 42. End point detection is provided by the reflecting surface of the workpiece holder 46. The beamlets 20a,b,c . . . shine through the drilled hole 48, reflect off the surface of the holder 46, and are detected by the feature and location device 44. This information is feed to computer 32, which identifies the corresponding micromirror of micromirror array 16, to be turned off. The computer 32, turns off the appropriate micromirror through interface 50.

The workpiece holder 46, is mounted on an x-y table consisting of a base 52, and x-y adjusting micrometers 54, and 56. It is understood that the micrometers 54 and 56 can be servo driven under computer control to position the workpiece 46 appropriately.

Figure 2:
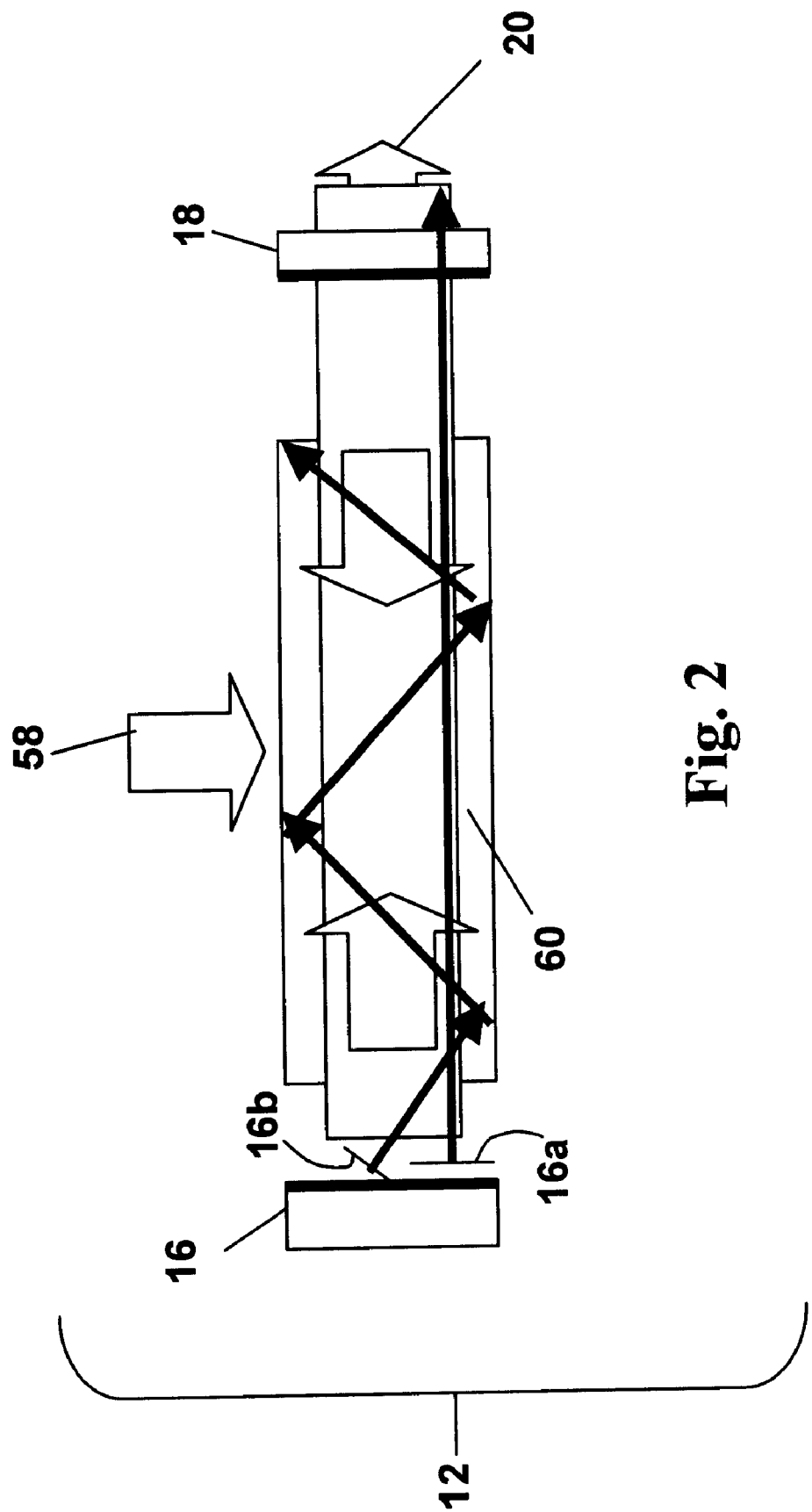
FIG. 2 illustrates the laser generating element of FIG. 1 in more detail.

FIG. 2 illustrates the laser of FIG. 1 in more detail. The laser 12, consists of laser cavity 14, partial reflector 18, a first micromirror array 16, and an a source of energy 58 and an amplifying medium 60. The micromirror array 16, is simplified by showing only two mirrors, one (16a) positioned to reflect the laser energy parallel to the cavity 14 axis and the other (16b) reflecting the laser energy in a zig-zag path within the cavity.

For micromirror 16a, which is positioned to reflect energy parallel to the axis of laser cavity 14, multiple passes through the amplifying medium 60 occur, and laser energy is generated sufficient to provide an output beam which emanates from the partial reflector 18 at the end of the laser cavity 14 opposite the micromirror array 16. Thus, the output of the laser 12 for each of such parallel aligned mirrors is a small beamlet, which when taken together comprise the plurality of beamlets 20. For micromirror 16b, which is so as to reflect the energy in a zigzag path through the cavity 14, no amplification takes place and no laser output beam results.

Figure 3C:
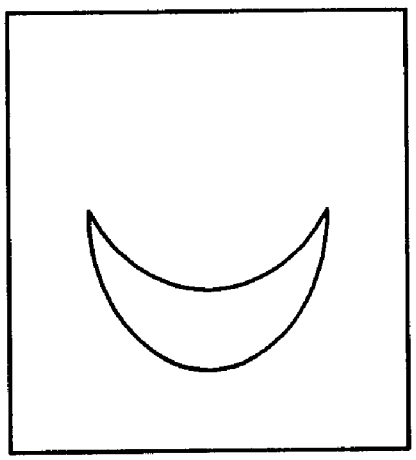
FIGS. 3a,b,c 4 illustrates the types of arbitrary pattern shapes that can be created by the first micromirror array.
Figure 3B:
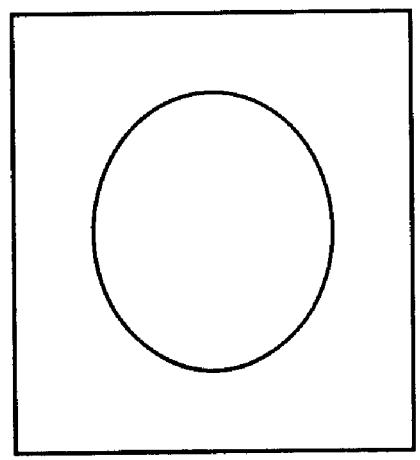
Figure 3A:
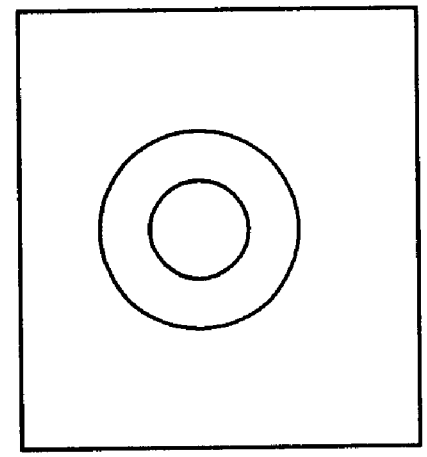

Since each individual micromirror 16a,b,c, . . . can be set to reflect energy either parallel or non-parallel to the axis of laser cavity 14, an array of laser output beamlets can be formed to produce two-dimensional patterns for a variety of applications including photolithography and material ablation. Further, since the beamlets can be turned on or off by computer 32, in accordance with input pattern 38, contoured patterns as illustrated in FIGS. 3a,b,c can be produced and imaged onto workpiece 50, for material machining.

It is understood that the micromirrors maybe operated in various modes including tilt, rotation, displacement and combinations thereof to produce various beamlet characteristics. Where displacement is used, different beamlet wavefronts are created, i.e. different lasing modes.

Figure 4:
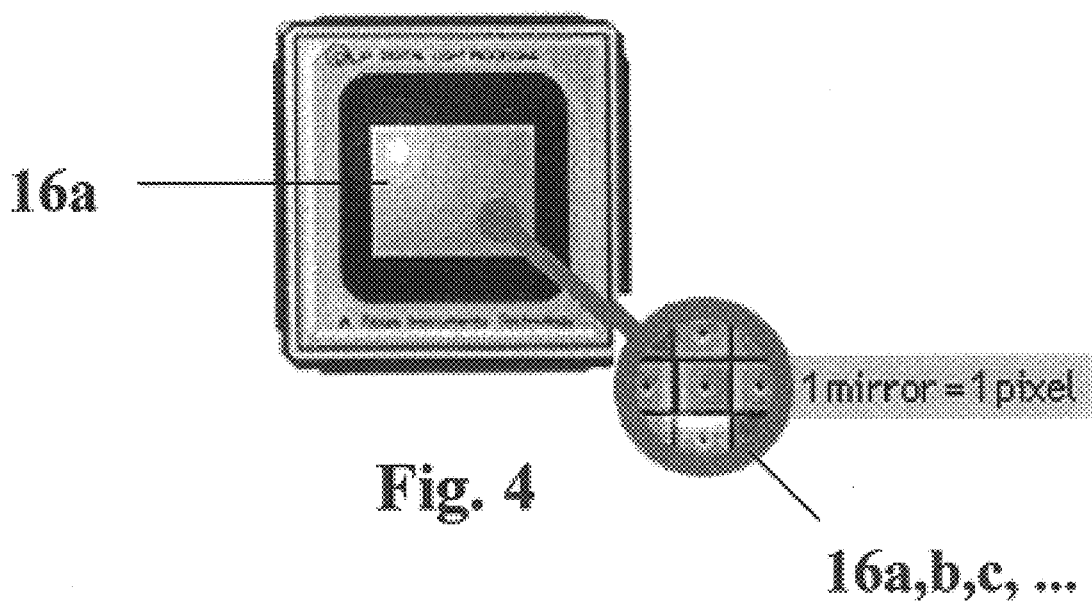
FIG. 4 illustrate the first array of micromirrors on FIG. 2 in more detail.

An individual micromirror 16a of micromirror array 16 is depicted in FIG. 4. The reflectivity of each mirror 16a,b,c . . . in the micromirror array 16 is optimized for the laser cavity wavelength. For operation at a particular wavelength the mirrors may be coated with additional or different reflective materials that are well known in the state of the art. For example, in the Digital Mirror Device (DMD) manufactured by Texas Instruments of Dallas, Tex., the individual mirrors are made of aluminum and can be coated for optimum reflectivity with multiple dielectric layers. It is understood that the Thin film Micromirror Array manufactured by Daewoo Electronics of Souel, Korea, and described below with respect to FIG. 7, as well as other devices made by other manufacturers of standard MEMS, are suitable for use in the device of FIG. 2.

Figure 5:
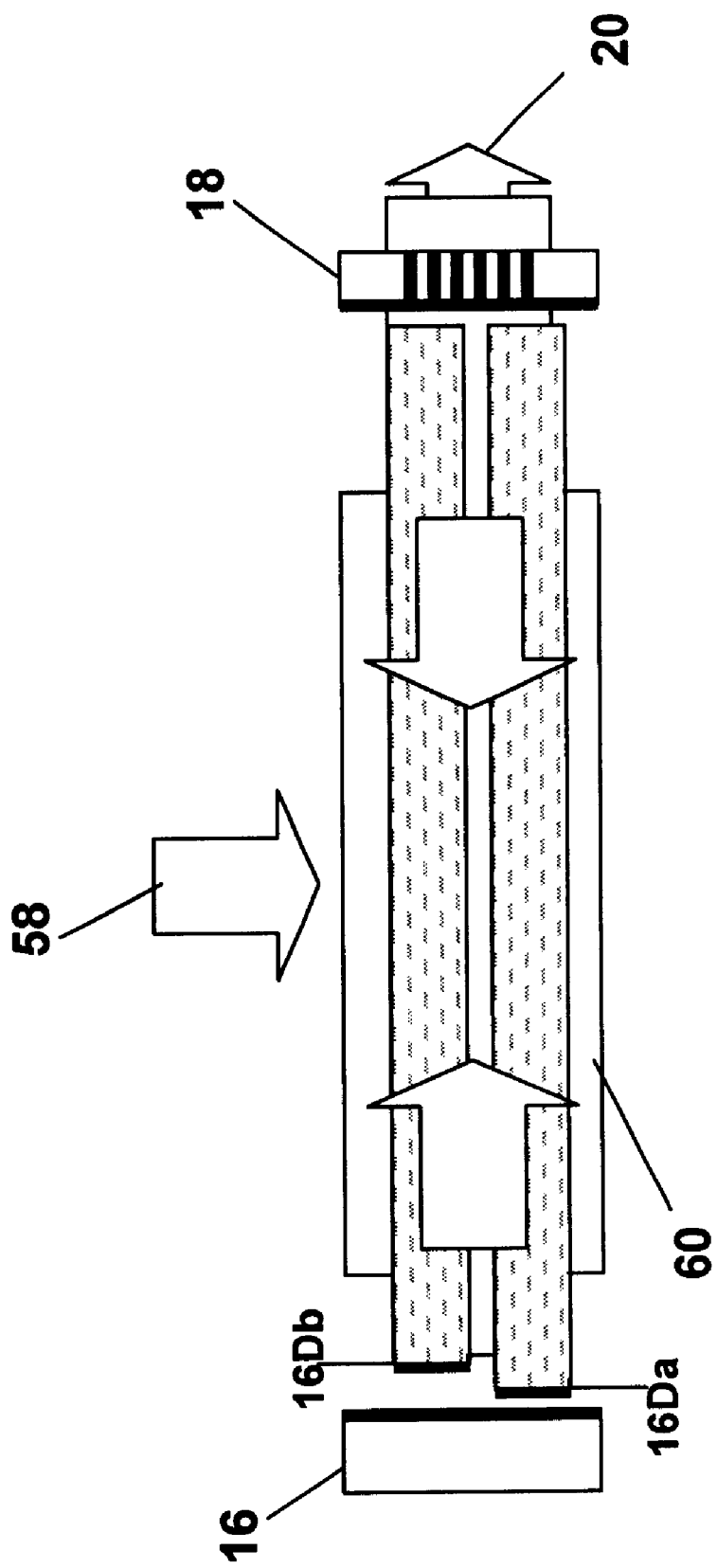
FIG. 5 illustrates an alternate embodiment of the laser of FIG. 1.

In the apparatus shown in FIG. 1, micromirror array 16, may be replaced by a deformable mirror array 16D as shown in FIG. 5. The simplified drawing illustrates two deformable micromirrors, 16Da and 16Db, of micromirror array 16D, with different axial displacements. These displacements are arranged in accordance with the desired beam profile set by input 38, and fed to array 16D, through the interface board 50. Different beam profiles can be produced including single and multi-beam Gaussians, rectangular, and triangular.

Figure 6:
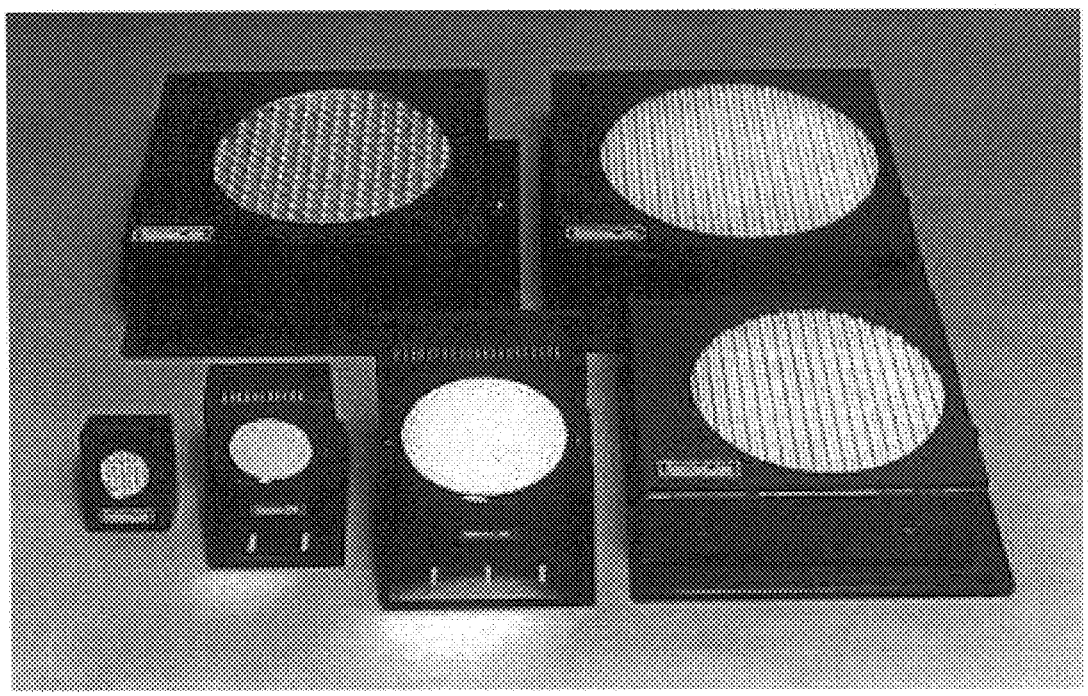
FIG. 6 illustrates a selection of deformable mirror arrays.

FIG. 6 illustrates several deformable mirrors manufactured by Xinetics Inc. Model number DM37PMNS4, has 37 mirrors deformable to 4 mm displacement, with electroceramic actuators spaced 7 mm apart to provide an aperture of 1.85 inches. The Xinetics drivers have a digital front end that uses a parallel interface which can be connected to a computer at rates up to 10 million bits per second. The actuators have a 2 kHz full amplitude bandwidth. Other higher resolution devices are available from Xinetics of Devens, Mass.

Figure 7:
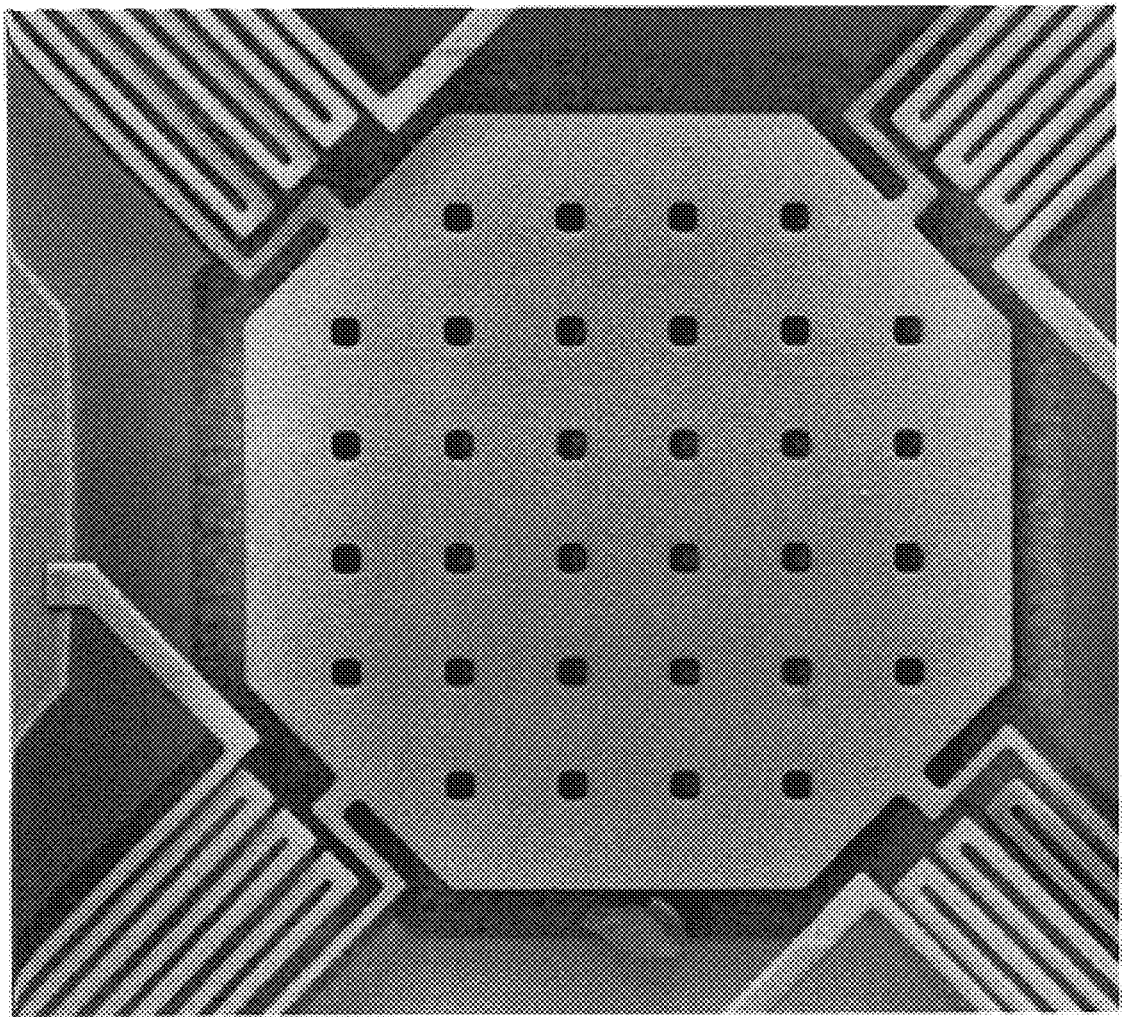
FIG. 7 is a photomicrograph of a single mirror element of a 6×6 displacement mirror array.

FIG. 7 illustrates a micromirror displacement element of a 6×6 array fabricated by MEMS Optical that maybe used as an alternate.

The individual micromirrors of second micromirror array 24 can be positioned to reflect laser beamlets of equal energy density, thereby acting as a homogenizer and producing a two-dimensional pattern on the surface of the workpiece. Alternatively, individual micromirrors of micromirror array 24 can be positioned to reflect laser beamlets of unequal energy density, thereby producing a three-dimensional pattern on the surface of the workpiece.

Figure 8:
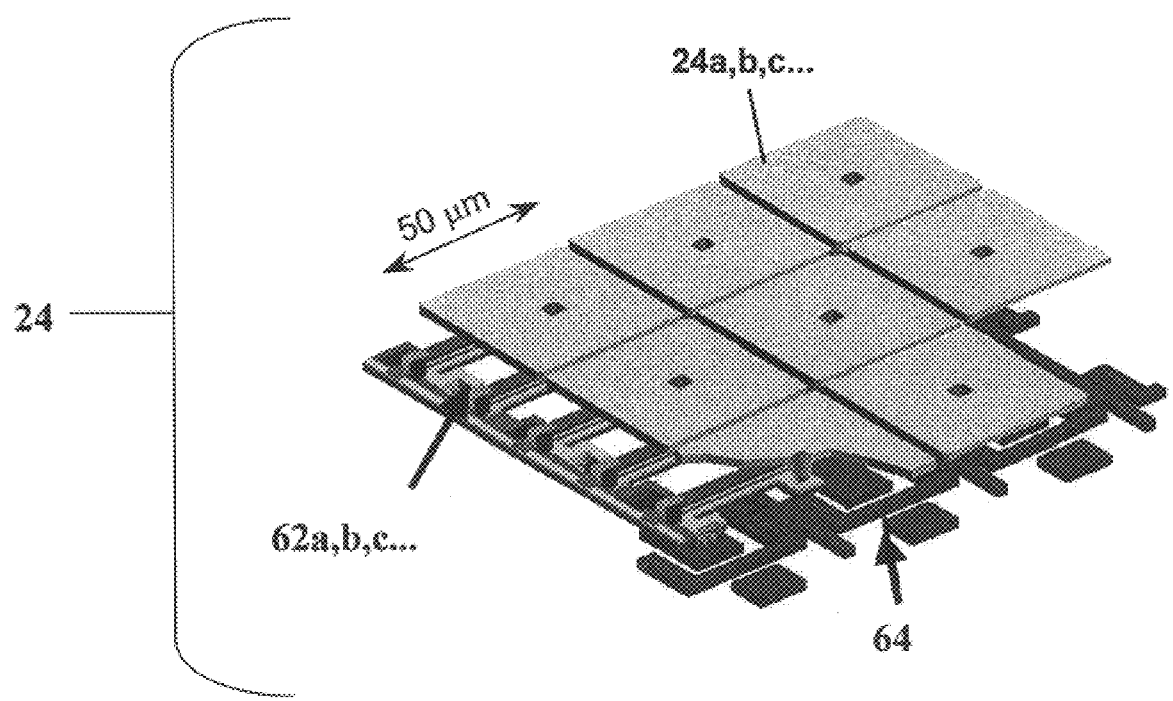
FIG. 8 is a schematic diagram of a Thin-film Micromirror Array.

An addressable micromirror array 24 suitable for use in the present invention is shown in FIG. 8. The array 24, known as a Thin film Micromirror Array (TMA), is manufactured by Daewoo Electronics, and consists of 1024×768, 50×50 micron mirrors 24a,b,c . . . , deflected by piezoelectric actuators 62a,b,c, . . . that in turn are addressed by an active matrix 64, and are linearly deflected as a function of the applied signal voltage. The TMA panel size is 2.54 inches diagonal. Each deflected laser beamlet is reimaged on to the workplace and its position adjusted by varying the tilt of mirrors 24a,b,c . . . Other acceptable linearly deflected micromirror arrays are made by Standard MEMS.

While the invention has been described with reference to a preferred embodiment thereof, it will be appreciated by those of ordinary skill in the art that modifications can be made to the structure and elements of the invention without departing from the spirit and scope of the invention as a whole.

What is claimed is:

1. An apparatus for simultaneous machining at several points on the surface of a workpiece, said apparatus comprising:

a laser including a laser cavity; and, a first micromirror array having a first plurality of individual micromirrors for generating a patterned plurality of discreet laser beamlets from a single laser beam;

a second micromirror array having a second plurality of individual micromirrors for modifying said patterned plurality of laser beamlets and deflecting same onto said several points of a workpiece; and, means for independently controlling each of said individual micromirrors of said first and said second plurality of micromirrors, wherein each individual micromirror of said first and said second plurality of micromirrors are changeable in position independently of each other.

2. The apparatus of claim 1 wherein said individual micromirrors of said first micromirror array are positioned to reflect energy parallel to the axis of said laser cavity to produce said patterned plurality of discreet laser beamlets.

3. The apparatus of claim 1 further comprising:

a first optical imaging means located between said first and said second micromirror arrays for imaging said patterned plurality of discreet laser beamlets onto said a second micromirror array.

4. The apparatus of claim 1 wherein said individual micromirrors of said second micromirror array are positioned to reflect laser beamlets of equal energy density to produce a two-dimensional pattern on said surface of said workpiece.

5. The apparatus of claim 1 wherein said individual micromirrors of said second micromirror array are positioned to reflect laser beamlets of unequal energy density to produce a three-dimensional pattern on said surface of said workpiece.

6. The apparatus of claim 1 further comprising:

a second imaging means located between said second micromirror array and said surface of said workpiece.

7. The apparatus of claim 1 further comprising:

spatial beam limiting means located between said second micromirror array and said second imaging means.

8. The apparatus of claim 1 further comprising:

a beam splitter located between said spatial beam limiting means and said second imaging means.

9. The apparatus of claim 1 wherein said first and said second micromirror arrays are linearly deflected micromirror arrays fabricated by microelectromechanical system techniques.

10. The apparatus of claim 1 wherein said second micromirror array comprises a Thin-film Micromirror Array® manufactured by Daewoo Electronics Co., Ltd.

11. The apparatus of claim 1 wherein said workpiece is a circuit board.

12. A method for simultaneous machining at several points on the surface of a workpiece, said method comprising the steps of:

a. generating a patterned plurality of discreet laser beamlets from a single laser beam in a lower cavity with a first micromirror array having a first plurality of individual micromirrors;

b. modifying said patterned plurality of laser beamlets and deflecting same onto several points of a workpiece with a second micromirror array having a second plurality of individual micromirrors; and, c. independently controlling each of said individual micromirrors of said first and said second plurality of micromirrors, wherein each individual micromirror of said first and said second plurality of micromirrors are changeable in position independently of each other.

13. The method of claim 12 wherein said patterned plurality of discreet laser beamlets is generated parallel to the axis of said laser cavity.

14. The method of claim 12 further comprising the step of:

d. imaging said patterned plurality of discreet laser beamlets onto said a second micromirror array.

15. The method of claim 12 wherein laser beamlets are reflected with equal energy density to produce a two-dimensional pattern on said surface of said workpiece.

16. The method of claim 12 wherein laser beamlets are reflected with unequal energy density to produce a three-dimensional pattern on said surface of said workpiece.

17. The method of claim 12 further comprising the step of:

e. imaging of said reflected laser beamlets onto said surface of said workpiece.

* * * * *